United States Patent
Hendershot, Jr. et al.

[15] 3,664,473
[45] May 23, 1972

[54] COMBINATION MAGNETIC PARTICLE CLUTCH AND BRAKE ASSEMBLY

[72] Inventors: James R. Hendershot, Jr.; Robert F. Searle, Amherst, both of N.H.

[73] Assignee: Vibrac Corporation, Chelmsford, Mass.

[22] Filed: July 9, 1970

[21] Appl. No.: 53,651

[52] U.S. Cl. ..........................................192/21.5, 192/12 D
[51] Int. Cl. ........................................................F16d 27/00
[58] Field of Search ........................................192/21.5, 12 D

[56] References Cited

UNITED STATES PATENTS

| | | | |
|---|---|---|---|
| 3,208,567 | 9/1965 | Metzger | 192/21.5 |
| 2,612,248 | 9/1952 | Feiertag | 192/21.5 |
| 2,573,065 | 10/1951 | Salenne | 192/21.5 |

*Primary Examiner*—Benjamin W. Wyche
*Assistant Examiner*—Randall Heald
*Attorney*—Schiller & Pandiscio

[57] ABSTRACT

A combination magnetic particle clutch and brake device and a method of assembling the same which comprises a single output shaft having a pair of spaced discs mounted thereon, with one disc used as part of a brake unit and the other disc used as part of a clutch unit. Brake and clutch driver coils are provided for energizing each of the units. Bearing assemblies are provided at opposite ends of the device to rotatably support the output shaft and an input rotor pole which is part of the clutch unit. The device is designed so as to facilitate assembly and to maintain very close tolerances in spacing of the parts without need for shimming.

11 Claims, 1 Drawing Figure

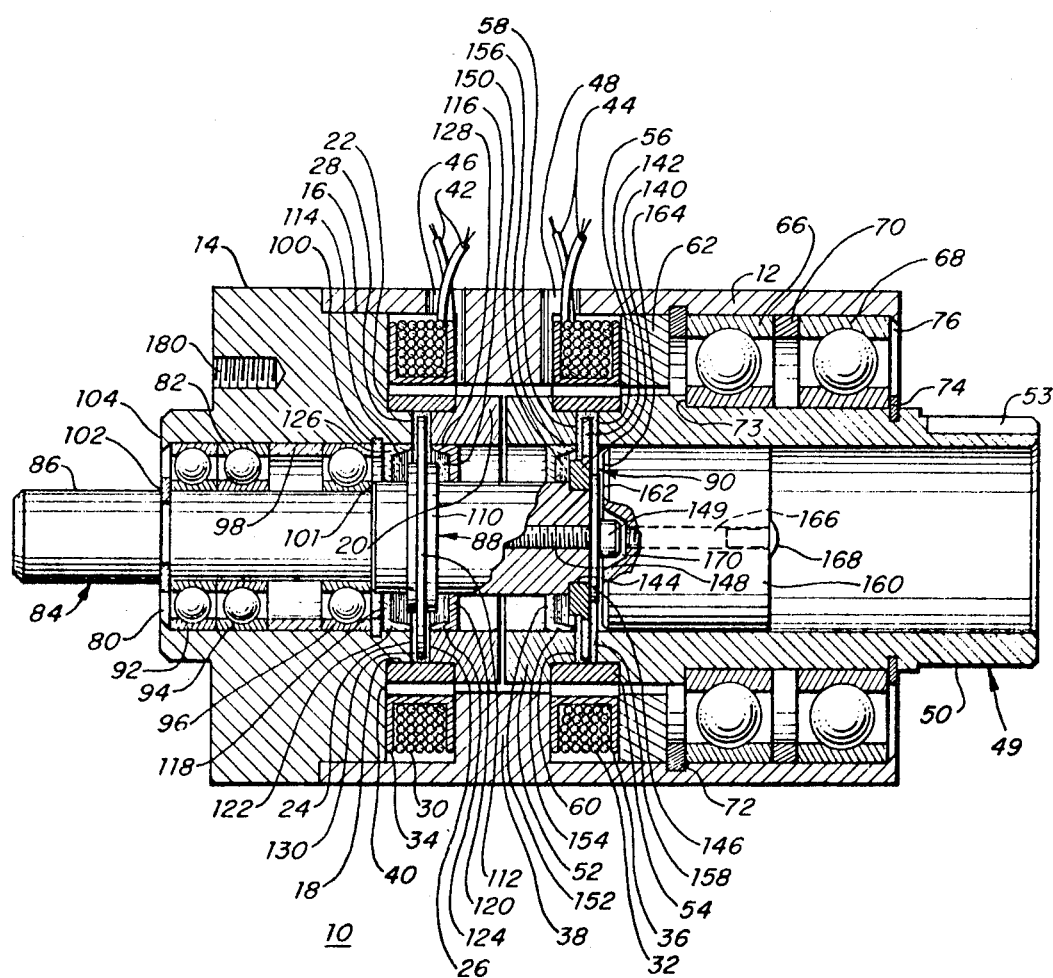
James R. Hendershot, Jr.
Robert F. Searle
INVENTORS.

COMBINATION MAGNETIC PARTICLE CLUTCH AND BRAKE ASSEMBLY

This invention relates to magnetic torque transmitting devices and more particularly to those devices employing magnetic particles in a combined clutch and brake assembly.

Magnetic particle devices of various types are well known to the art. Most commonly they are constructed to function as quick-acting electrically actuated clutches or brakes. Combination magnetically energized clutch and brake devices are also known in the art and are extremely useful in providing quick-response, selectively energizable combination clutch and brake units which may be employed, for example, in a tape driven mechanism. The present invention is concerned with an improvement that greatly simplifies the construction and assembly as well as the accuracy and reliability of such combination magnetic particle clutch and brake assemblies. Typically prior devices of the type to which the invention relates consist of a single rotatably mounted output shaft having two or more radially extending discs mounted fixedly thereon. The brake assembly consists of first and second stationary members mounted about one of the discs with a spacing therebetween which is filled with magnetic particles, plus a coil to selectively establish a magnetic flux between the stationary members and the disc in order to magnetically lock the particles and prevent relative rotation between the disc and the stationary magnetic members. The clutch assembly comprises a rotor structure mounted about but spaced from another of the discs, with the intervening spaces being filled with magnetic particles. The clutch assembly is provided with a coil to selectively establish a magnetic flux between the rotor structure and the associated disc in order to lock the particles into torque-transmitting chains coupling the disc and rotor structure. The rotor serves as an input or driving member to impart rotation to the output shaft when the clutch coil is energized. Bearing assemblies are provided at the ends and intermediate the ends of the unit for permitting rotation of the rotor structure and the output shaft. These bearing units are subjected to both axial and radial thrust. Such prior devices have been difficult to fabricate and assemble and problems have been incurred in eliminating end play between the relatively moveable parts. Accordingly, it has been necessary to employ shims in order to maintain the necessary close tolerance spacing between the discs and their respective armatures and also to properly maintain the other components in optimum operating relation to each other.

Accordingly, an object of the present invention is to provide a combination magnetic particle clutch and brake assembly which is relatively simple to construct and assemble.

Another object of this invention is to provide a combination magnetic particle clutch and brake assembly which is constructed so as to provide and maintain very close tolerances for the gaps on each side of each disc.

Still another object of the present invention is to provide a combination magnetic particle clutch and brake assembly which in its construction and assembly eliminates the necessity for shimming the several parts.

A further important object is to provide a magnetic particle clutch or brake assembly that is designed so that the magnetic particles can be loaded under dynamic conditions to achieve a predetermined torque, whereby to facilitate production of a number of devices with identical performance characteristics.

Another object of the present invention is to provide an improved method of making magnetic particle clutch and brake assemblies.

Still another object of the present invention is to provide a combination magnetic particle clutch and brake assembly in which the output shaft extends only partially through the assembly and the rotor structure has plugging means for preventing the escape of magnetic particles from the gap around the clutch unit.

The above objects, features and advantages of the apparatus of the present invention, as well as others, are accomplished by providing a combination magnetic particle clutch and brake assembly comprising an output shaft having first and second spaced discs affixed thereto. The brake unit includes a stationary magnetic armature member disposed on opposite sides of the first disc and spaced therefrom so that magnetic particles may be loaded into the space. A brake driver coil is provided which when energized establishes a flux path through the armature member and the first disc. The clutch unit includes a rotor member enclosing and spaced from the second disc so that magnetic particles may be loaded into the space. A clutch driver coil is provided which when energized establishes a magnetic flux path through the rotor member, the stator member and the second disc. Sealing means prevent escape of magnetic particles from the spaces. The device is designed so that portions of the clutch and brake sections form discrete subassemblies and the output shaft and rotor member are rotatably supported by means which eliminate the necessity for shimming any of the parts of the assembly.

Other objects and many of the attendant advantages of this invention are believed to be apparent from the following specification which is to be considered together with the accompanying drawing, wherein:

The FIGURE is a longitudinal partial sectional view of a combination magnetic particle clutch and brake assembly constituting a preferred embodiment of the present invention.

Turning now to the figure, there is illustrated a combination magnetic particle clutch and brake assembly 10 comprising stationary field coils, an input unit, an output unit, and bearing assemblies mounted in a cylindrical housing 12 fitted at one end with an annular base or shaft support 14. Housing 12 and shaft support 14 are made of magnetic material and may be press fitted as shown, snap-fitted or screwed to one another (not shown) at a portion indicated by numeral 16. Shaft support 14 serves as a member of the magnetic stator or armature of a brake unit which will be described later.

The inner end of shaft support 14 is reduced in diameter as shown at 18 and is secured to a second annular armature member 20 by means of a spacer sleeve 22. Member 20 is made of magnetic material and sleeve 22 is made of non-magnetic material, preferably stainless steel. Sleeve 22 may be secured to shaft support 14 and member 20 by a press fit or by other means such as by welding or by pins or screws (not shown). Inner transversely extending faces 24 and 26 of shaft support 14 and member 20 respectively are spaced from one another by sleeve 22 to define a gap 28 and function as poles of the brake armature to develop a magnetic field through portions of the brake unit.

A pair of annular field coils 30 and 32 each wound around bobbins 34 and 36 respectively and of known construction are secured in grooves in housing 12. Both bobbins 34 and 36 abut opposing faces of an intervening ring 38 projecting from the wall of housing 12. Bobbin 34 is held in abutting position with one face of ring 38 by a face 40 of base 14. Ring 38 also functions as a stator pole. The opposite ends of coils 30 and 32 are each connected to pairs of leads 42 and 44 respectively which project out of housing 12 through suitable openings 46 and 48 respectively. Leads 42 and 44 are used to couple coils 30 and 32 to an external power source (not shown) whereby they may be energized.

An input unit identified generally by numeral 49 is provided and comprises a hollow input rotor 50 which partially extends outside housing 12. The portion of rotor 50 which extends outside housing 12 has a keyway 53 formed on the outer surface thereof which allows the rotor 50 to be coupled to a source of torque input. Attached to the inner end of rotor 50 by a spacer sleeve 54 is a member 52 constructed like member 20. Sleeve 54 may be secured to rotor 50 and member 52 by a press fit or by other suitable means such as screws (not shown). Rotor 50 and member 52 are made of magnetic material so as to function as armature members of the clutch unit, while sleeve 54 is made of a non-magnetic material. Rotor 50 and member 52 have inner transversely extending faces 56 and 58 respectively which are spaced from one another to define a gap 60 and function as poles to direct a magnetic field through portions of the clutch unit. Mounted within housing 12 adjacent to but spaced from rotor 50 is an annular member 62 which is made of magnetic material and functions as a stator pole. (It is to be noted that housing 12 functions as the stator of the clutch and is also part of the magnetic circuit of the brake unit.) One side of member 62 engages and holds bobbin 36 against the adjacent side surface of the inwardly extending ring 38 of the wall housing 12.

Rotor 50 is rotatably supported in housing 12 by means of a bearing assembly comprising a pair of bearings 66 and 68 separated by a bearing spacer 70. The exact positions of bearings 66 and 68 are determined at one end by an annular retainer ring 72, which snaps into a groove formed in the inner wall of housing 12, and a shoulder 73 on rotor 50 against which bearing 66 abuts. Bearing 68 is held in firm position by a retainer ring 72, which snaps into a groove formed on the outer surface of rotor 50, and by a staked portion 76 on the end of housing 12. It is to be noted that staking as at 76 is for convenience and that the same result could be achieved by means of a snap ring or by a threaded nut screwed onto and locked to housing 12. Bearings 66 and 68 and spacer 70 are all held firmly in position by retainer ring 72 and shoulder 73 at one end and retainer ring 74 and staked portion 76 at the other end without necessity for shimming any of the parts. Retainer ring 72 also engages annular member 62 whereby the latter bears against bobbin 36 to hole it in proper position against one face of ring 38. It is essential that the retainer ring 74 be made so that when inserted in the groove in rotor 50 in will provide sufficient axial force to appropriately pre-load bearings 66 and 68. Preferably it is formed with a cross-sectional bow. However, is also could be wavy like a wavy spring washer or wedge shaped in cross-section so as to take up all play and eliminate the need for shims.

The base 14 has an axial bore or opening 80 defined by an inner wall 82. Inner wall 82 functions as a bearing support for an output unit identified generally by numeral 84. The output unit 84 comprises a shaft 86 constructed of non-magnetic material and a pair of discs 88 and 90. The shaft 86 is rotatably supported by means of a bearing assembly comprising a pair of bearings 92 and 94 abutting one another and a third bearing 96 separated from bearings 92 and 94 by a bearing spacer 98. It is to be noted that the number of bearings used may vary depending upon what is required to support the external load applied to shaft 84. The outer race of bearing 96 engages a retainer ring 100 which snaps into a groove formed in the wall 82, while its inner race engages a shoulder 101 on shaft 86. The inner race of bearing 92 is held in firm position by a retainer ring 102 which snaps into a groove formed on the outer surface of shaft 86, while its inner race is held against axial movement by a staked portion 104 on the end of base 14. The staking at 104 could be omitted and the same result achieved by means of a retaining ring mounted in base 14 or a nut screwed onto and locked to the end of bore 14. Retainer ring 102 is of the same type as ring 74 and could be replaced by some other means such as a nut if the end of shaft 86 were threaded. Bearings 92, 94 and 96 and bearing spacer 98 are all firmly held in position between retainer ring 100 and shoulder 101 at one end and retainer ring 102 and staked portion 104 at the other end without necessity for shimming any of the parts.

Disc 88 is secured to shaft 86 so that it is positioned to extend radially between faces 24 and 26 in gap 28. Disc 88 may consist of a single member made of magnetic material. Preferably, however, it consists of two concentric rings of different thicknesses, with the inner ring 110 being non-magnetic and comprising a radially-extending flange formed integral with shaft 86. If it is not formed integrally with shaft 86, ring 110 may be press-fitted welded, brazed or inductively soldered onto shaft 86. Outer ring 112, which has a thickness or dimension in the direction parallel to the axis of shaft 86 less than the thickness in the same direction of inner ring or projection 110, is made of a magnetic material such as No. 2 relay steel. The outer diameter of the outer ring 112 is slightly less than the inner diameter of sleeve 22 so as to provide a gap therebetween. The outer ring 112 may be attached to the inner ring or projection 110 of shaft 86 in a variety ways, as for example, by press fitting or inductive soldering.

Mounted in sealing engagement with the opposite faces of inner ring 110 and also the shaft 84 are face seals 114 and 116. Seals 114 and 116 are secured to and housed in circular seal cups 118 and 120 respectively which have a generally L-shaped cross-section so as to provide projecting edges 112 and 124 respectively that surround and engage the outer ends of seals 114 and 116 respectively. The cups 118 and 120 are made of non-magnetic material such as brass and the seals 114 and 116 housed therein are made of a suitable resilient sealing material such as rubber or plastic-impregnated felt. The outer surfaces 126 and 128 of edges 122 and 124 respectively are press fitted against the inner wall 82 of base 14 and member 20 respectively. The inner diameter of cups 118 and 120 is greater than the adjacent diameter of the shaft 84, and the edges 122 and 124 extend axially of shaft 86 to just short of engagement with magnetic ring 112. The ends of face seals 114 and 116 adjacent the projecting edges 122 and 124 of cups 118 and 120 together with said edges and the faces 24 and 26 adjacent the outer ring 112 and sleeve 22 function to close off the annular space defining gap 28 between disc 88 and the base 14 and member 20. This space of gap is filled with dry magnetic particles 130. Disc 88 serves as part of a brake unit whose functioning will be described in conjunction with the operation of the assembly 10.

The disc 90 also may be a single disc of magnetic material. Preferably, however, it consists of two concentric rings of different thicknesses. Inner ring 140 is made of non-magnetic material. Outer ring 142 is made of a magnetic material such as No. 2 relay steel. The outer diameter of the outer ring 142 is slightly less than the inner diameter of sleeve 54 so as to provide a gap therebetween. The outer ring 142 may be attached to the inner ring 140 in a variety of ways, as for example, by press fitting or inductive soldering. Disc 90 has a D-shaped opening (not shown) and is mounted on the end of shaft 86 on a portion 144 which is correspondingly keyed in the form of a D. The disc 90 is held in place on keyed D portion 144 of the shaft 86 by a washer 146 and a cap screw 148 having a cap 149. Engaging the inner ring 140 is a face seal 150. Seal 150 is secured to and housed in a circular non-magnetic seal cup 152 which has a generally L-shaped cross-section so as to provide projecting edge 154 that surrounds and engages the outer end of seal 150. The cup 152 is made of non-magnetic material and does not engage shaft 84. The seal 150 housed therein is made of a suitable resilient sealing material such as rubber or plastic-impregnated felt. The outer surface 156 of edge 154 is press fitted against the inside surface of member 52. The outer diameter of cup 152 is greater than the outer diameter of the inner ring 140, and the edge 154 extends axially of shaft 42 to just short of engagement with magnetic ring 142. The end of face seal 150 adjacent the projecting edge 154 of cup 152 together with said edges and the faces 56 and 58 of rotor 50 and member 52 respectively adjacent the outer ring 142 and sleeve 54 function to close off the annular space of gap 60 between disc 90 and the rotor 50 and member 52. This space is filled with dry magnetic particles 158. Disc 90 serves as part of a clutch unit whose functioning will be described in conjunction with the operation of the assembly 10.

Face seals 114, 116 and 150 are annular members which are of substantially rectangular cross-section when viewed in section as in the figure. When mounted in the assembly 10, their side surfaces engage the side faces of inner rings 110 and 140 respectively tightly enough to form a firm seal therewith and yet permit rotation of shaft 86 and discs 88 and 90. Additionally, with respect to their inner diameters, the seals are sized so that when they are seated, they are radially compressed and make firm engagement with shaft 86. These seals serve to prevent the escape of the magnetic particles from gaps 28 and 60, thereby increasing the life of the assembly.

A plug 160 is provided in the center opening in rotor 50. Plug 160 has an end face 162 with a beveled edge 164 for ease of insertion of the plug which is positioned immediately adjacent and very slightly spaced from washer 146. Plug 160 serves to prevent magnetic particles 158 from escaping from gap 60 through the opening passing through rotor 50. Plug 160 has a pressure relief hole 166 passing therethrough which after inserted into position within rotor 50 is sealed by a rivet 168. Other sealing means such as epoxy potting compound could be used to seal hole 166 when plug 160 is properly seated. At an end 170 of hole 166, a portion of plug 160 is relieved to permit the entry of cap 149 of screw 148 which permits the plug to be spaced as close as is necessary to washer 146. Instead of hole 166, the necessary pressure relief could be provided by scoring plug 160 on its outer periphery to provide air passages from gap 60. In such case, after plug 160 is inserted, the air passages would be sealed, for example, with an epoxy potting compound.

A clutch-brake device as above described lends itself to combining parts thereof in at least two discrete subassemblies and allows the magnetic particles 138 and 158 to be loaded into their respective gaps under dynamic conditions so that the quantity of particles can be adjusted to provide exactly the torque desired. The base 14 is provided with one or more threaded holes such as shown at 114 for mounting the base on a rigid support to facilitate assembly and also to mount the fully assembled device to a machine or system in which it is to be used. Assembly of the device is described below.

One subassembly operation commences with insertion of retainer ring 100 into its groove in the inner wall 82 of base 14, with the latter mounted on a suitable fixed support (not shown) by means of a cap screw screwed into hole 180. Next bearing 96, spacer 98, and bearings 94 and 92 are consecutively inserted into opening 80 from the left end of base 14. When they are fully inserted and properly positioned with opening 80 in base 14, the end of base 14 is staked as shown at 104 to lock this bearing assembly in place. Cup 118 containing face seal 114 is then inserted from the right end of base 14 in opening 80 so that cup 118 abuts retainer ring 100. Cup 118 is press fitted into position. Then shaft 86 with disc 88 already thereon is inserted thereon the right end of base 114 into opening 80 so as to pass through bearings 96, 94 and 92 and project outside the left end of base 14. Shaft 86 is then locked in place by application of retainer ring 102. Next sleeve 22 is secured onto the right end 18 of base 14, followed by the attachment of armature member 20. The sleeve 22 is dimensioned so as to accurately provide the correct spacing required between faces 24 and 26.

The next subassembly operation consists of insertion of bobbin 34 carrying brake coil 30 into housing 12 and then securing the housing onto base 14 so as to captivate bobbin 34 as shown. The housing 12 may be secured to base 14 by a press-fit or by means of screws (not shown) screwed into the base through the side wall of the housing. Then shaft 84 is coupled to a motor through a torque transducer, preferably of the type shown in U. S. Pat. No. 3,495,452, and the leads of coil 30 are coupled to a suitable power supply. Next the power supply is turned on and some magnetic powder is poured into the gap 28. The magnetic field established by coil 30 pulls the magnetic particles together in the gap 28. Then while the coil is still energized the motor is turned on to rotate shaft 84. The magnetized particles magnetically couple disc 88 to the pole faces 24 and 26 with the result that a torque resistance to shaft rotation is established. The torque transducer provides a measurement of the torque resistance. Assuming that initially the torque resistance is too low, additional powder is poured into the gap until the torque resistance is at the desired level. Then the said motor is turned off and the cup 120 containing face seal 116 is press-fitted into place. Coil 30 may be turned off before or after face seal 116 is installed.

The next subassembly operation consists of insertion of bobbin 36 carrying coil 32, stator pole member 62 and retaining ring 72 into housing 12.

Another subassembly consists of assembling clutch rotor 50, sleeve 54, annular pole member 52 and disc 90. Sleeve 54 is press-fitted onto the left end of rotor 50, followed by insertion of disc 90 into gap 60 and attachment of member 52. Sleeve 54 is dimensioned so as to accurately provide the correct spacing between faces 56 and 58. Then cup 150 carrying face seal 150 is press-fitted in position through the left-hand end of pole member 52.

Next the clutch rotor assembly is installed in housing 12. This may be done from the left-hand end of the housing by first detaching the housing from base 14. Preferably, however, it is done from the right hand end of the housing in the manner now to be described. The clutch rotor assembly is inserted from the right hand end of the housing with seal cup 152 fitting over shaft 84. Shaft 84 is then rotated until its right hand end portion 144 is keyed with disc 90, after which washer 146 is applied and secured in place by cap screw 148. Then bearing 66, spacer 70 and bearing 68 are inserted in the order named from the right hand end of housing 12 which is then staked as shown at 76. The rotor assembly is pulled axially to the right to bring its shoulder tight against the inner race of bearing 66 and secured against leftward axial movement by application of retainer ring 74 as shown.

Next magnetic particles are loaded into gap 60 from the right hand end of rotor 50 through the opening therein. The amount of magnetic particles required to give the desired clutching torque between rotor 50 and shaft 84 is determined by energizing clutch coil 32 and driving shaft 84 through a motor and torque transducer in the manner described above in connection with loading particles into the gap 28 of the brake unit. After the desired amount of magnetic powder has been loaded into gap 60, plug 160 is press-fitted into place as shown. Hole 166 in plug 160 allows escape of air displaced by the plug as it is inserted and thereby prevents a pressure buildup which might force the particles out of the gap. Once plug 160 is in place, hole 166 is closed off by insertion of rivet 168 therein.

The device 10 may be assembled as above described without need for shimming of the several parts while accurately maintaining the spacing of the component parts with one another and close tolerances of the gaps in which the discs 88 and 90 are located. Thus, it is possible to achieve very close tolerances such that gaps of 0.015 inches may be maintained on each side of each of the discs without the necessity for shimming parts. Because of the close tolerances that may be maintained between parts and because the torque characteristics of the brake and clutch units may both be adjusted by varying the amount of powder in the gaps as above described, it is possible to produce a number of brake-clutch devices with substantially identical performance characteristics.

Operation of the above-described combination clutch and brake assembly 10 will now be explained. When coil 32 is energized via leads 44, a magnetic field is established across the particles 158 through the stator pole 62, rotor 50, the outer ring 142 of disc 90, member 52 and ring 38 of housing 12. With such flux linkage across the particles 158, the latter will lock in chains between rotor 50, member 52 and outer ring 142, thereby coupling the input unit 49 with the output unit 84. The transmitted torque is controllable by varying the strength of the magnetic field. Rotation of rotor 50, member 52, and disc 90 together with shaft 86 serves as a clutch unit which may be operated at any desired torque level or between any two or more torque levels by selection of appropriate energizing currents.

Once the clutch unit is operating as described above, if it is desired to brake the rotation of shaft 86 of output unit 84, coil 32 is deenergized while coil 30 via leads 42 is simultaneously energized. With energization of coil 30 a magnetic field is established across the particles 130 in gap 28 through ring 38 of housing 12, base 14, member 20 and the outer ring 112 of disc 88. The flux linkage across particles 30 will cause them to lock in chains between base 14, member 20 and ring 112 of disc 88, whereby shaft 86 is braked. The clutch and brake units both have very fast response, making the device suitable for fast response applications as, for example, magnetic tape drive units.

It is to be understood that the invention is not limited in its application to the details of construction and arrangement of parts specifically shown or described and that within the scope of the appended claims, it may be practiced otherwise than as spacifically shown or described.

We claim:

1. A combination magnetic particle clutch and brake device comprising:
   a hollow housing made of a magnetic material;
   an output shaft having first and second radially extending discs spaced apart therealong and rotatable therewith;
   a brake unit including a hollow magnetic armature and a brake driver coil to establish a magnetic flux path through said hollow armature and said first disc when energized;
   said hollow armature being disposed within and secured to said housing at one end thereof and said brake driver coil being disposed within and secured to said housing in surrounding relation to said hollow armature;
   said hollow armature having poles disposed on opposite sides of said first disc in axial spaced relation thereto, and means extending between said poles closing off the space between said poles and said disc, the space between said first disc and said poles being filled with magnetic particles;
   a clutch unit disposed within said housing, said clutch unit comprising a hollow magnetic rotor having poles disposed on opposite sides of said second disc in coaxial spaced relation thereto and means extending between said poles closing off the space between said poles and said second disc, the space between said second disc and said rotor being filled with magnetic particles and one end of said hollow rotor protruding from the other end of said housing so as to serve as an input shaft for said device;
   said output shaft extending through said hollow armature with one end thereof protruding from one end of said device and the other end thereof terminating within said rotor;
   a clutch driver coil to establish a magnetic flux path through said rotor and said second disc when energized, said clutch driver coil being disposed within and secured to said housing in surrounding relation to said rotor;
   sealing means to prevent said magnetic particles from escaping from said spaces; and
   bearing means rotatably supporting said shaft and said rotor, said bearing means consisting of a first bearing assembly at one end of said device rotatably mounting said output shaft to said hollow armature; and a second bearing assembly at the opposite end of said device rotatably mounting said rotor to said housing.

2. An assembly as set forth in claim 1 wherein said output shaft extends through said hollow armature with one end thereof protruding from one end of said device and the other end thereof terminating within said rotor and further wherein said second disc is on said other end of said shaft and said sealing means includes
   radially extending sealing members disposed on opposite sides of said first disc for preventing escape of particles from said space between said first disc and said armature member;
   a radially extending sealing member disposed on one side of said second disc; and
   a plug disposed in and secured to said rotor immediately adjacent to and slightly spaced from the other side of said second disc.

3. A device according to claim 2 wherein said plug is adapted to provide at least one pressure relief opening which allows air to escape from the space around said second disc without escape of magnetic particles when said plug is inserted in said rotor opening.

4. A device according to claim 1 wherein said second disc is located at said other end of said output shaft.

5. A device according to claim 4 wherein said first bearing assembly is located between said one end of said output shaft and said first disc and said second bearing assembly is located between said other end of said output shaft and the outer end of said rotor.

6. A device according to claim 5 wherein
   said shaft has a shoulder between said one end thereof and said first disc; and further wherein
   said first bearing assembly comprises
   a first retaining ring concentric with but spaced from said shaft mounted in said hollow armature on the side of said first disc opposite that of said second disc,
   a first bearing abutting said first retaining ring and said shoulder,
   a spacer abutting said first bearing;
   a second bearing abutting said spacer; and
   means on said output shaft and said hollow armature holding said bearings and said spacer in said abutting relation and cooperating with said retaining ring and said shoulder to prevent axial movement of said output shaft relative to said hollow armature member.

7. A device according to claim 6 wherein said last mentioned means includes a second retaining ring mounted in a groove in said output shaft.

8. a device according to claim 5 wherein said rotor has a shoulder on the side of said second disc opposite that of said first disc; and said second bearing assembly comprises
   a retaining ring concentric with but spaced from said rotor mounted inside of and secured to said housing on the side of said second disc opposite that of said first disc;
   a first bearing disposed so that one end abuts said retaining ring and said shoulder;
   a spacer abutting said first bearing;
   a second bearing abutting said spacer; and
   means on said housing and said rotor holding said first and second bearings and said spacer in said abutting relation and cooperating to prevent axial movement of said rotor relative to said housing.

9. A combination magnetic particle clutch and brake device comprising;
   a hollow housing and a base secured in one end of said housing;
   said base including a pair of axially spaced poles of magnetic material and means connected to said poles and extending across the space between said poles so as to form a first chamber, said base also having an axial bore;
   a shaft rotatably mounted in said axial bore;
   a first disc on said shaft extending into said first chamber;
   magnetic particles in said first chamber and sealing means preventing escape of said particles from said first chamber;
   a hollow rotor including a pair of axially spaced poles of magnetic material and means connected to said poles and extending across the space between said poles to form a second chamber, said hollow rotor being rotatably mounted in said housing in axial alignment with said shaft;
   a second disc on said shaft extending into said second chamber;
   magnetic particles in said second chamber and sealing means in said rotor preventing escape of magnetic particles from said second chamber; and
   first and second selectively energizeable coils in said housing, said first coil being positioned so that when energized it produces magnetic flux through the poles of said base, said first disc and the magnetic particles in said first chamber, said second coil being positioned so that when energized it produces magnetic flux through said rotor poles, said second disc and the magnetic particles in said second chamber;
   one end of said shaft extending out of said base and one end of said rotor extending out of said housing, said second disc being releasably secured to the other end of said shaft by releasable means accessible through said one end of said rotor.

10. A method of adjusting the torque characteristic of a magnetic particle coupling device of the type comprising a rotatable shaft with a magnetic disc thereon, a hollow magnetic armature surrounding said shaft and having (a) poles disposed on opposite sides of said disc in axial spaced relation thereto and (b) a non-magnetic sleeve connected to and extending between said poles in radial spaced relation to said disc for closing off the space between said poles and said disc so as to form a chamber of magnetic particles, means rotatably supporting said shaft in said armature, an electrically energizable coil for establishing a magnetic field through said armature and said disc, and first and second sealing members disposed between said shaft and said armature on opposite sides of said disc, said method comprising introducing magnetic powder to said chamber while only said first sealing member is in place, said powder being introduced to said chamber from the side opposite said first sealing member, energizing said coil to compact the powder in said chamber, measuring the torque required to rotate said shaft in said armature while said coil is energized, varying the amount of powder in said chamber until the torque required to rotate said shaft in said armature with said coil energized reaches a predetermined level, and then installing said second sealing member.

11. A device according to claim 4 wherein said second disc is formed as a separate member, and further including means accessible through said hollow rotor for releasably affixing said second disc to said output shaft.

* * * * *